Aug. 2, 1960 M. A. NELSON 2,947,370
GARDEN TOOL
Filed July 26, 1955

INVENTOR
Milton A. Nelson
BY McCanna and Morsbach
ATT'YS

# United States Patent Office 2,947,370
Patented Aug. 2, 1960

2,947,370
GARDEN TOOL
Milton A. Nelson, Rockford, Ill., assignor to Thomas A. Nelson, Rockford, Ill.

Filed July 26, 1955, Ser. No. 524,464

5 Claims. (Cl. 172—375)

This invention relates to garden tools and has special reference to a tool of the type used by home gardeners for hand planting and tilling.

Important objects of the invention are the provision of a combination garden tool which may be manufactured at minimum cost as to tools and dies, as to material and as to labor; which occupies a minimum of space for economical packaging and storage; which is sturdy and durable in construction; which is light in weight and which is easy to manipulate in use.

Figure 2:
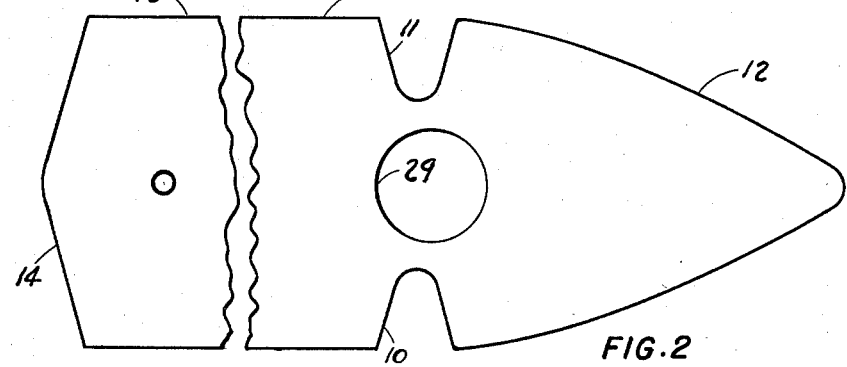
Fig. 2 is a plan view of the sheet metal blank from which the body is formed.
Figure 4:
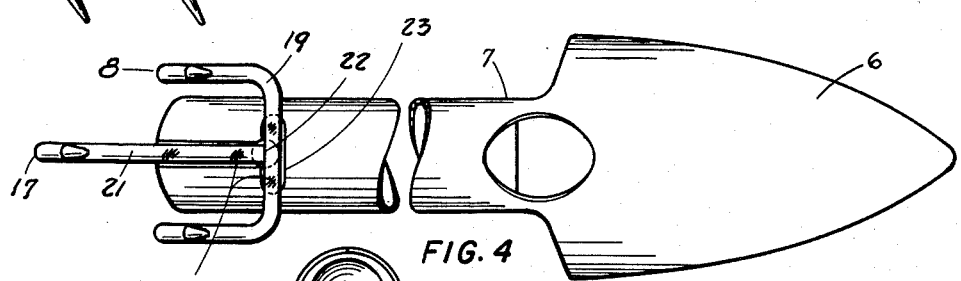
Fig. 4 is a bottom view of one end of the tool showing the manner in which the cultivator tines are attached.
Figure 5:
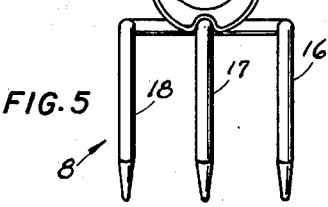
Fig. 5 is an end view of the tool.

The tool comprises a sheet metal body shaped to form a scoop-like blade or trowel blade 6 and a tubular handle 7, and a cluster of tines 8 best shown in Figs. 4 and 5 attached to the handle at the end opposite the trowel blade 6. The body is formed from a sheet metal blank 9 having the shape shown in Fig. 2. This blank is stamped out of sheet metal stock, the metal being notched out as indicated at 10 and 11 along opposite sides of the blank, one end thereof tapering inwardly from the notches toward the end as indicated at 12. The portion of the blank extending in the other direction from the notches 10 and 11 may conveniently have straight sides such as indicated at 13 and the end of the blank is preferably tapered outwardly to the longitudinal center line of the blank as indicated at 14.

This blank is formed or bent about its longitudinal center line so that the edges 13 are bent upwardly substantially into contact with each other to form a tube. Preferably this tube is cylindrical in shape. The two edges 13 may then be welded together either throughout their length or at spots as indicated at 15. I prefer to make the body of sheet metal of sufficiently heavy section that it is not absolutely necessary to weld the edges 13 in order for the handle to retain its shape, but nevertheless such welding is preferable. Of course if the body is made of very thin gauge metal, welds at these points may be essential.

The blank is also bent upwardly along its longitudinal center line to form the blade 6. However this bend is formed on a relatively wide arc to form a scoop or trowel-like blade suitable for handling soil in gardening operations. The specific arcuate shape of this blade or the curvature of its edges are of course not critical and within wide limits this blade may be shaped to suit the fancy of the manufacturer.

In the preferred form the tines are formed in a cluster 8, in this instance comprising three downwardly directed teeth indicated at 16, 17 and 18 sharpened at their lower ends. The teeth 16 and 18 are the terminal portions of a wire having a base 19. The tooth 17 is one end of a wire having a base 21, the opposite end of the wire being affixed to the base 19 intermediate its ends as indicated at 22 so that the base 19 and the base 21 form a W shaped structure.

The bottom of the body is formed with a T shaped recess 23 formed to receive portions of the base 19 and the base 21 so that these elements are cradled in the recess. The base members are preferably welded into position in the recess as by spot welds 24. By forming the tines as a cluster in the manner described, economies in manufacture may normally be made inasmuch as the cluster can be made up as a unit in wire handling machines. Likewise by providing the recess 23 in the body the assembly may be brought into proper aligned position and welded in place with speed and accuracy. Since the base of the tines is cradled in the recess, much of the strain which may be applied to the tines in use is taken by the walls of the recess and any tendency toward fracture at the welds is greatly decreased.

Figure 1:
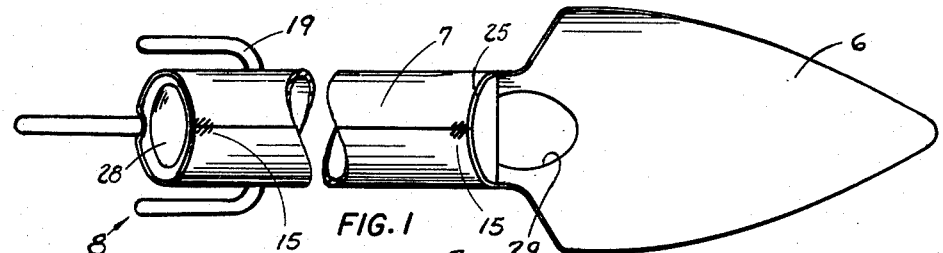
Fig. 1 is a top view of the tool.
Figure 3:
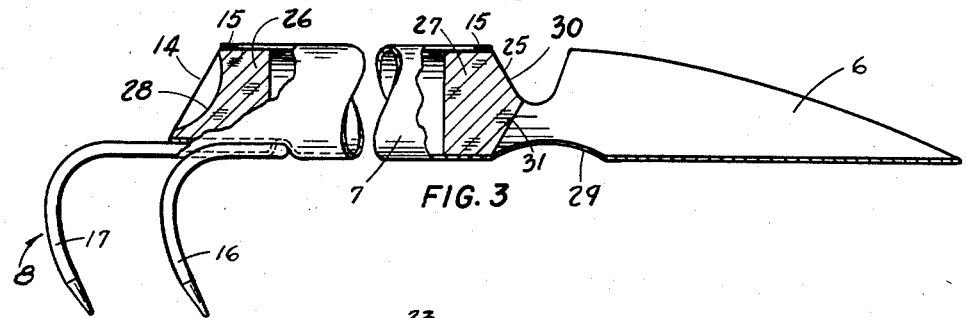
Fig. 3 is a side view thereof partly in section.

The angular end faces 14 of the blank serve to provide an end for the handle which slopes outwardly from top to bottom of the handle as will be apparent from Figs. 1 and 3. Likewise the notches 10 and 11 are so shaped as to provide a similarly sloping edge 25 at the blade end of the handle. Positioned in each end of the handle is a plug or closure member, these plugs being indicated at 26 and 27. The plugs may be made of wide variety of materials such as wood, cork, rubber or plastics, but preferably they are formed of a material which has some resiliency and which can be driven or forced into the ends of the tube and be retained therein through their own resiliency or by the use of conventional cements. The plug 26 has a face the perimeter of which follows the sloping edge 14, but which has a central depression 28 for the reception of the end of the index finger of the user.

The trowel blade 6 is provided with an opening 29 directly in front of the plug 27 and the forward end of the plug is provided with a face 30 which follows the contour of the edge 25 and a lower face 31 which slopes rearwardly over the rear portion of the opening 29 as best seen in Fig. 3. The opening 29 and the face 31 are of principal value when the trowel is used in soil which tends to pack and stick. When the trowel is used in moist or wet soils, particularly those containing clay, the soil tends to pack adjacent the handle. With this construction as the sticky soil works back along the blade it comes into contact with the face 31 which forces it down through opening 29.

It will be seen that the tool herein disclosed is so constructed that it may be made at a minimum of cost in labor, material and tools. The body is formed of a single piece of sheet metal the sides of which are bent upwardly about its longitudinal center line to provide the handle and the trowel blade. These operations can be conducted with dies of simple design, low cost, and long life. The tine cluster can be formed at low cost in conventional wire working machines and assembled to the body as a unit in such a manner that the stresses applied to the tines in use are largely transmitted directly to the body and not through the welds. The tubular handle is closed at its ends so as to largely prevent it from becoming filled with soil, but more important, to provide a finger rest for comfortable hand gripping by the user.

I claim:

1. A hand garden tool comprising a sheet metal body having a straight longitudinal centerline, an end section of the body having its side portions curved upwardly about the longitudinal centerline of the body and terminating with the side edges thereof in abutting relation above the longitudinal center line of the body to define a tubular handle for the tool, the other end section of the body having its side portions curved upwardly from the longitudinal centerline of the body in a wide arc, the edges of said other section tapering inwardly toward its free end to form a scoop-like blade, and a plurality of cultivator tines attached to the handle adjacent its free end, said tines projecting downwardly below the longitudinal centerline of the body and having lower end portions slanting downwardly from the free end of said handle in a direction toward the free end of said other section.

2. A hand garden tool comprising a sheet metal body having a straight longitudinal centerline, an end section of the body having its side portions curved upwardly about the longitudinal centerline of the body and terminating with the side edges thereof in abutting relation above the longitudinal center line of the body to define a tubular handle for the tool, the other end section of the body having it side portions curved upwardly from the longitudinal centerline of the body in a wide arc, the edges of said other section tapering inwardly toward its free end to form a scoop-like blade, a first tine attached to said body at the longitudinal centerline thereof extending outwardly beyond the free end of said handle, at least two other tines attached to said body at the underside thereof and disposed at relatively opposite sides of said first tine, said tines projecting downwardly below the longitudinal centerline of the body and having lower end portions slanting downwardly in a direction toward the free end of said other section.

3. A hand garden tool comprising a sheet metal body having a straight longitudinal centerline, an end section of the body having its side portions curved upwardly about the longitudinal centerline of the body and terminating with the side edges thereof in abutting relation to define a tubular handle for the tool, the other end section of the body having its side portions curved upwardly from the longitudinal centerline of the body in a wide arc, the edges of said other section tapering inwardly toward its free end to form a scoop-like blade, said body having a longitudinal recess formed in the underside of said one end portion extending to the free end of said handle and a transverse recess in the underside of said one end portion spaced inwardly from the free end of said handle, a first tine having an attachment portion disposed in said longitudinal recess and secured to said handle, an arcuate shank portion on said first tine disposed in the plane of the longitudinal centerline of the body, a pair of wire tines having a common attachment portion disposed in said transverse recess and rigidly secured to said handle, said pair of tines each including an arcuate shank portion disposed in a plane parallel to the plane of the shank portion of said first tine, said shank portions of each of said tines projecting downwardly below the longitudinal centerline of the body and having lower end portions slanting downwardly from the free end of said handle toward the free end of said other section.

4. A hand garden tool comprising a sheet metal body having a straight longitudinal centerline, an end section of the body having its side portions curved upwardly about the longitudinal centerline of the body and terminating with the side edges thereof in abutting relation to define a tubular handle for the tool, the other end section of the body having its side portion curved upwardly from the longitudinal centerline of the body in a wide arc, the edges of said other section tapering inwardly toward its free end to form a scoop-like blade, said body having an opening therein spaced from the sides thereof and located at the junction of said handle and blade, and a plug positioned in the end of said tubular handle adjacent said blade, said plug having a surface sloping downwardly and rearwardly over the opening to direct earth accumulating on the blade out through the opening.

5. A garden tool comprising a sheet metal body having a straight longitudinal centerline, an end section of the body having its side portions curved upwardly about the longitudinal centerline of the body and terminating with the side edges thereof in abutting relation to define a tubular handle for the tool, the other end section of the body having its side portions curved upwardly from the longitudinal centerline of the body in a wide arc, the edges of said other section tapering inwardly toward its free end to form a scoop-like blade, a plurality of cultivator tines attached to the handle adjacent its free end, said tines projecting downwardly below the longitudinal centerline of the body and having lower end portions slanting downwardly from the free end of said handle in a direction toward the free end of said other section, said body having an opening therein at the juncture of said one end section with said other end section, said opening intersecting the longitudinal centerline of the body and terminating in spaced relation to the side edges of said other end section, and a plug in the end of said tubular handle adjacent said blade, said plug having a surface sloping downwardly and rearwardly over said opening to direct earth out through the opening.

References Cited in the file of this patent

UNITED STATES PATENTS

| | | |
|---|---|---|
| 972,404 | Pond | Oct. 11, 1910 |
| 1,484,948 | Kimberlin | Feb. 26, 1924 |
| 1,620,480 | Matthai | Mar. 8, 1927 |
| 2,006,672 | Combs | July 2, 1935 |
| 2,487,518 | Brooke | Nov. 8, 1949 |
| 2,539,181 | Brown | Jan. 23, 1951 |

FOREIGN PATENTS

| | | |
|---|---|---|
| 213,134 | Great Britain | Mar. 27, 1924 |
| 232,596 | Great Britain | July 1, 1926 |